United States Patent
Messely et al.

(10) Patent No.: US 10,735,659 B2
(45) Date of Patent: Aug. 4, 2020

(54) ROTATION-ADAPTIVE VIDEO ANALYTICS CAMERA AND METHOD

(71) Applicant: FLIR Systems, Inc., Wilsonville, OR (US)

(72) Inventors: Pieter Messely, Ronse (BE); Dwight T. Dumpert, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/115,455

(22) Filed: Aug. 28, 2018

(65) Prior Publication Data

US 2018/0367739 A1    Dec. 20, 2018

Related U.S. Application Data

(63) Continuation of application No. PCT/US2017/022826, filed on Mar. 16, 2017, which
(Continued)

(51) Int. Cl.
*H04N 5/222* (2006.01)
*H04N 5/232* (2006.01)
(Continued)

(52) U.S. Cl.
CPC ....... *H04N 5/23299* (2018.08); *G03B 17/561* (2013.01); *G06T 7/70* (2017.01);
(Continued)

(58) Field of Classification Search
CPC .......... H04N 5/23299; H04N 5/23258; H04N 5/23267; H04N 5/33; H04N 5/222;
(Continued)

(56) References Cited

U.S. PATENT DOCUMENTS

| 931,635 A * | 8/1909 | McKay ................... H04N 7/18 |
| | | 348/143 |
| 6,292,222 B1 | 9/2001 | Bernhardt |
| | (Continued) | |

FOREIGN PATENT DOCUMENTS

| CN | 103702070 | 4/2014 |
| WO | WO 2005/048605 | 5/2005 |

OTHER PUBLICATIONS

"Corridor format," Axis Communications, 2 Pages [online], [retrieved on Oct. 11, 2018]. Retrieved from the Internet: <http://www.axis.com/global/en/learning/web-articles/technical-guide-to-network-video/axis-corridor-format>.

*Primary Examiner* — Marly S Camargo
(74) *Attorney, Agent, or Firm* — Haynes and Boone, LLP

(57) ABSTRACT

Various embodiments of the methods and systems disclosed herein may be used to provide a surveillance camera that generates native video image frames in the appropriate FOV (orientation) that corresponds to the orientation in which the surveillance camera is installed when the video image frames are captured. The surveillance cameras implemented in accordance with embodiments of the disclosure may facilitate installation that provides a desired FOV in a particular orientation, generate video image frames that natively correspond to the desired FOV, and allow user interaction and video analytics to be performed on the FOV-matched video image frames.

20 Claims, 10 Drawing Sheets

Related U.S. Application Data is a continuation-in-part of application No. 15/456,074, filed on Mar. 10, 2017.

(60) Provisional application No. 62/309,940, filed on Mar. 17, 2016, provisional application No. 62/309,956, filed on Mar. 17, 2016.

(51) Int. Cl.

| | | |
|---|---|---|
| *H04N 5/33* | (2006.01) | |
| *H04N 5/18* | (2006.01) | |
| *G06T 7/80* | (2017.01) | |
| *G06T 7/70* | (2017.01) | |
| *G03B 17/56* | (2006.01) | |
| *G08B 13/196* | (2006.01) | |
| *H04N 7/18* | (2006.01) | |

(52) U.S. Cl.
CPC .......... *G06T 7/80* (2017.01); *G08B 13/19617* (2013.01); *G08B 13/19667* (2013.01); *H04N 7/183* (2013.01); *H04N 5/23258* (2013.01); *H04N 5/23267* (2013.01); *H04N 5/33* (2013.01)

(58) Field of Classification Search
CPC .. H04N 7/183; G06T 7/00; G06T 7/70; G06T 7/80; G06T 17/561; G08B 13/196; G08B 13/19667; G08B 13/19608; G08B 13/19656; G08B 13/19665; G08B 13/2462; G08B 29/20; G06K 9/00624
USPC .... 348/222.1, 143, 159, 152, 153, 154, 155, 348/169, 187, 194, 208.14, 211.99, 211.3, 348/211.4, 211.8, 211.11, 36, 47; 382/184, 289, 296; 396/427, 428

See application file for complete search history.

(56) References Cited

U.S. PATENT DOCUMENTS

| | | | |
|---|---|---|---|
| 7,599,000 B2* | 10/2009 | Lai | F16M 11/08 |
| | | | 348/373 |
| 8,259,174 B2 | 9/2012 | Zhang et al. | |
| 9,491,337 B2* | 11/2016 | Elensi | H04N 5/225 |
| | | | 348/373 |
| 10,033,945 B2* | 7/2018 | Ekeroth | H04N 5/332 |
| | | | 348/82 |
| 10,267,454 B1* | 4/2019 | Ortiz | F16M 13/022 |
| | | | 396/427 |
| 2007/0165137 A1 | 7/2007 | Lai | |
| 2011/0228112 A1 | 9/2011 | Kaheel et al. | |
| 2012/0188441 A1* | 7/2012 | Takizawa | H04N 5/2253 |
| 2013/0342700 A1 | 12/2013 | Kass | |
| 2014/0152815 A1 | 6/2014 | Huang et al. | |
| 2015/0093035 A1 | 4/2015 | Saptharishi et al. | |
| 2015/0172567 A1 | 6/2015 | Ekeroth | |
| 2015/0181123 A1 | 6/2015 | Pacurariu et al. | |
| 2016/0112608 A1* | 4/2016 | Elensi | H04N 5/2252 |
| | | | 348/155 |

* cited by examiner

ROTATION-ADAPTIVE VIDEO ANALYTICS CAMERA AND METHOD

CROSS-REFERENCE TO RELATED APPLICATIONS

This application is a continuation of International Patent Application No. PCT/US2017/022826 filed Mar. 16, 2017 and entitled "ROTATION-ADAPTIVE VIDEO ANALYTICS CAMERA AND METHOD," which is incorporated herein by reference in its entirety.

International Patent Application No. PCT/US2017/022826 filed Mar. 16, 2017 claims priority to and the benefit of U.S. Provisional Patent Application No. 62/309,940 filed Mar. 17, 2016 and entitled "ROTATION-ADAPTIVE VIDEO ANALYTICS CAMERA AND METHOD," which is hereby incorporated by reference in its entirety.

International Patent Application No. PCT/US2017/022826 filed Mar. 16, 2017 claims priority to and the benefit of U.S. Provisional Patent Application No. 62/309,956 filed Mar. 17, 2016 and entitled "MINIMAL USER INPUT VIDEO ANALYTICS SYSTEMS AND METHODS" which is hereby incorporated by reference in its entirety.

International Patent Application No. PCT/US2017/022826 filed Mar. 16, 2017 is a continuation-in-part of U.S. patent application Ser. No. 15/456,074 filed Mar. 10, 2017 and entitled "MINIMAL USER INPUT VIDEO ANALYTICS SYSTEMS AND METHODS," which claims priority to U.S. Provisional Patent Application No. 62/309,956 filed Mar. 17, 2016 and entitled "MINIMAL USER INPUT VIDEO ANALYTICS SYSTEMS AND METHODS," which are hereby incorporated by reference in their entirety.

TECHNICAL FIELD

One or more embodiments of the invention relate generally to imaging devices and more particularly, for example, to image processing and video analytics techniques for surveillance cameras and methods.

BACKGROUND

Typical surveillance cameras, when installed in their intended orientation, have a field-of-view (FOV) with a wider horizontal dimension than a vertical dimension. Thus, typical surveillance cameras capture and generate video image frames in an aspect ratio that matches the wide horizontal FOV, such as in 5:4, 4:3, 3:2, or 16:9 width-to-height aspect ratios or other aspect ratios having a larger width (horizontal dimension) than height (vertical dimension). However, for some surveillance applications, a FOV having a larger vertical dimension than the horizontal dimension may be beneficial, such as when monitoring foot and/or vehicle traffic up and down a deep corridor, a long sidewalk, or a long road.

In such applications, much of the FOV on the horizontal dimension may be wasted (e.g., not capturing any meaningful portions of a monitored scene), while the shorter vertical dimension may not be sufficient for viewing down a long corridor, sidewalk, or road, for example. Even if these surveillance cameras are mounted not in their normal orientation but on their sides to capture more vertical area of a scene, the captured video image frames would not correspond to the rotated FOV and thus would be difficult for users to interpret. Thus, there is a need for improved analytics techniques for surveillance camera that takes into account the orientation of the camera.

SUMMARY

Various embodiments of the methods and systems disclosed herein may be used to provide a surveillance camera that generates native video image frames in the appropriate FOV (orientation) that corresponds to the orientation in which the surveillance camera is installed when the video image frames are captured. The surveillance cameras implemented in accordance with embodiments of the disclosure may facilitate installation that provides a desired FOV in a particular orientation, generate video image frames that natively correspond to the desired FOV, and allow user interaction and video analytics to be performed on the FOV-matched video image frames.

In one aspect, for example, a surveillance camera according to one or more embodiments of the disclosure may include: an imaging sensor configured to generate image signals representing a scene within a sensor field of view (FOV) of the imaging sensor, wherein the sensor FOV has a vertical dimension and a horizontal dimension that is wider than the vertical dimension; an adjustable mount configured to securely attach the surveillance camera to a structure and adjustable to rotate or pivot the surveillance camera about the optical axis direction; and a logic device communicatively coupled with the imaging sensor and configured to: determine a rotational orientation of the surveillance camera about the optical axis direction; generate, based on the image signals and the determined rotational orientation, video image frames having an output FOV with a vertical dimension that corresponds to the determined rotational orientation; and perform video analytics on the generated video image frames.

In another aspect, a method for providing rotation-adaptive video image frames according to one or more embodiments of the disclosure may include the steps of: generating, by an imaging sensor of a surveillance camera, image signals representing a scene within sensor field of view (FOV) of the imaging sensor, the sensor FOV having a vertical dimension and a horizontal dimension that is wider than the vertical dimension; determining, by a logic device of the surveillance camera, a rotational orientation of the surveillance camera about the optical axis direction of the surveillance camera; generating, by the logic device based on the image signals and the determined rotational orientation, video image frames having an output FOV with a vertical dimension that corresponds to the determined rotational orientation; and performing video analytics on the generated video image frames The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
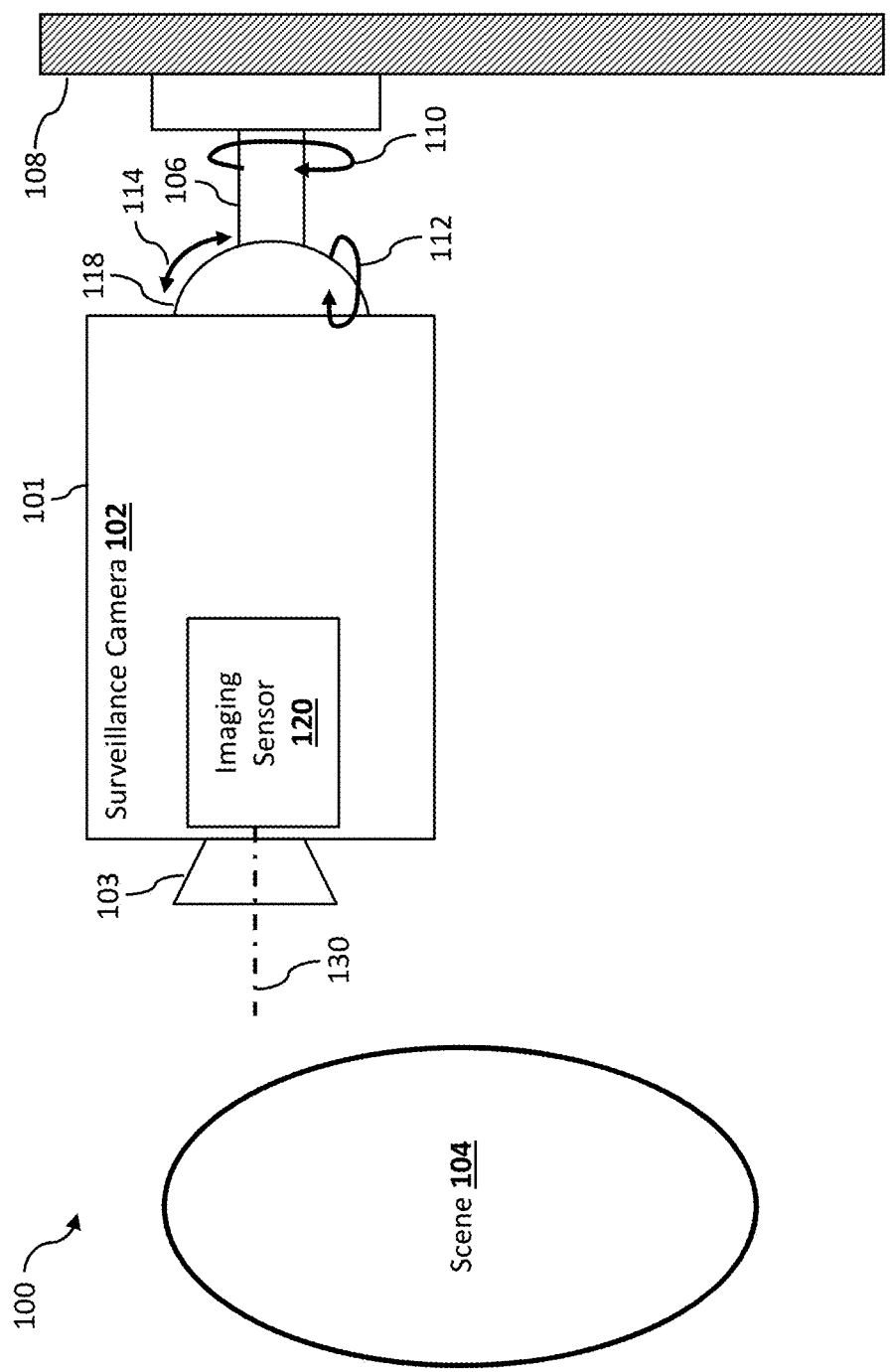
FIG. 1 illustrates an operating environment in which a surveillance camera may operate in accordance with an embodiment of the disclosure.

Various embodiments of the methods and systems disclosed herein may be used to provide a surveillance camera that generates native video image frames in the appropriate field of view (FOV) (orientation) that corresponds to the orientation in which the surveillance camera is installed when the video image frames are captured. As mentioned above, typical surveillance cameras, when installed in their intended orientation, have a FOV with a wider horizontal dimension than a vertical dimension. Thus, typical surveillance cameras capture and generate video image frames in an aspect ratio that matches the wide horizontal FOV, such as in 5:4, 4:3, 3:2, or 16:9 width-to-height aspect ratios or other aspect ratios having a larger width (horizontal dimension) than height (vertical dimension). However, for some surveillance applications, a FOV having a larger vertical dimension than the horizontal dimension may be beneficial, such as when monitoring foot and/or vehicle traffic up and down a deep corridor, a long sidewalk, or a long road.

In such applications, much of the FOV on the horizontal dimension may be wasted (e.g., not capturing any meaningful portions of a monitored scene), while the shorter vertical dimension may not be sufficient for viewing down a long corridor, sidewalk, or road, for example. Even if these surveillance cameras are mounted not in their normal orientation but on their sides to capture more vertical area of a scene, the captured video image frames would not correspond to the rotated FOV and thus would be difficult for users to interpret. Further, even if the captured video image frames are rotated back after the fact (e.g., by a client device at a remote monitoring station after receiving the captured video image frames from the surveillance camera), it would be difficult if not impossible to perform user interaction and video analytics on the video image frames since they are rotated merely for displaying, but are not natively in a proper aspect ratio and orientation to permit further video analytics and user interaction operations on them.

Thus, it is necessary to perform certain operations within the surveillance camera to take into account the rotational orientation of the camera such that the video image frames that are natively outputted from the camera have the proper FOV (orientation) for calibration and/or video analytics (e.g., object detection, etc.). In this regard, cameras (e.g., surveillance cameras) implemented in accordance with embodiments of the disclosure may facilitate installation that provides a desired FOV in a particular orientation, generate video image frames that natively correspond to the desired FOV, and allow user interaction and video analytics to be performed on the FOV-matched video image frames. For example, a surveillance camera according to one or more embodiments of the disclosure may include: an imaging sensor configured to generate image signals representing a scene within a FOV of the imaging sensor, the FOV has a vertical dimension and a horizontal dimension that is wider than the vertical dimension; an adjustable mount that is configured to securely attach the camera to a structure and adjustable to rotate or pivot the surveillance camera about the optical axis direction; and a logic device communicatively coupled to the imaging sensor and configured to determine a rotational orientation of the surveillance camera about the optical axis direction, generate, based on the image signals and the determined rotational orientation, video image frames having an output FOV with a vertical dimension that corresponds to the determined rotational orientation, and perform video analytics on the generated video image frames. Thus, a surveillance camera in one or more embodiments of the disclosure may provide rotation-adaptive video analytics natively on the camera side, thereby advantageously allowing users to orient the surveillance camera to perform video analytics on video image frames having a desired vertical FOV.

Further details of such beneficial features are discussed with reference to the figures. FIG. 1 illustrates an environment 100 in which a surveillance camera 102 may be operated. Surveillance camera 102 includes an imaging sensor 120 and optical elements 103. Imaging sensor 120 is configured to generate image signals representing a scene 104 within a FOV associated with imaging sensor 120. The FOV associated with imaging sensor 120 may be defined by the sensor dimension (e.g., the width and height of the sensor comprising sensor elements arranged in an two-dimensional array) and optical elements 103 that direct electromagnetic radiation (e.g., including visible light, near infrared (IR) radiation, thermal IR radiation, ultraviolet (UV) radiation) from scene 104 to the imaging sensor 120. The FOV associated with imaging sensor 120 includes a horizontal dimension and a vertical dimension, and imaging sensor 120 is positioned in surveillance camera such that the horizontal dimension of the imaging sensor is wider than the vertical dimension of the imaging sensor when surveillance camera 100 is in its normal (e.g., upright) position. For example, the FOV associated imaging sensor 120 may have an aspect ratio of 5:4, 4:3, 3:2, 16:9 (width-to-height), or other ratios in which the width is larger than the height when surveillance camera 102 is in its normal (upright) position.

Imaging sensor 120, in some embodiments, may include a visible light (VL) imaging sensor which may be implemented, for example, with a charge-coupled device (CCD) sensor, a complementary metal-oxide semiconductor (CMOS) sensor, an electron multiplying CCD (EMCCD), a scientific CMOS (sCMOS) sensor and/or other appropriate image sensor to generate image signals of visible light received from the scene. Depending on the sensor type, VL camera may be configured to capture electromagnetic radiation in other wavelengths in addition to or instead of visible light.

Imaging sensor 120, in some embodiments, may include an IR imaging sensor which may be implemented, for example, with a focal plane array (FPA) of bolometers, thermocouples, thermopiles, pyroelectric detectors, or other IR sensor elements responsive to IR radiation in various wavelengths such as for example, in the range between 1 micron and 14 microns. In one example, image sensor 120 may be configured to capture images of near IR and/or short-wave IR radiation from the scene. In another example, image sensor 120 may be a thermal IR sensor configured to capture images of IR radiations in the mid-wave (MWIR) or long-wave (LWIR) wavelength ranges. In some embodiments, image sensor 102 of surveillance camera 102 may include both a VL imaging sensor and a IR imaging sensor.

Surveillance camera 102 can be securely attached to a structure 108 (e.g., a wall, ceiling, pole, or other structure appropriate for installing surveillance camera 102 for surveillance purposes) via adjustable mount 106. Adjustable mount 106 is adjustable to rotate or pivot the surveillance camera about the optical axis direction. That is, adjustable mount 106 allows a housing 101 of surveillance camera 102 to rotate or pivot 110 about an axis that is parallel or substantially parallel to the optical axis 130 of optical elements 103 and imaging sensor 120, such that the horizontal dimension of imaging sensor 120 spans vertically and the vertical dimension of imaging sensor 120 spans horizontally when rotated or pivoted 110 at approximately 90 degrees or 270 degrees. In this way, adjustable mount 106 allows users to rotate or pivot surveillance camera 102 conveniently to provide a larger vertical FOV when desired (e.g., when monitoring foot and/or vehicle traffic up and down a deep corridor, a long sidewalk, or a long road).

Adjustable mount 106 in some embodiments may be configured to rotate or pivot housing 101 of surveillance camera 102 to adjust additionally for yaw 112 (e.g., for panning) and/or pitch 114 (e.g., for tilting). The additional ranges of adjustment by adjustable mount 106 may further facilitate installation of surveillance camera 102 on a variety of mounting points (e.g., including a corner of a room) at desired pan and/or tilt angles. In one or more specific examples, adjustable mount 106 may include a rotatable joint 118 (e.g., a ball joint) that allows rotation or pivoting in directions 110, 112, and 114 (e.g., roll, yaw, and pitch, respectively).

Figure 2:
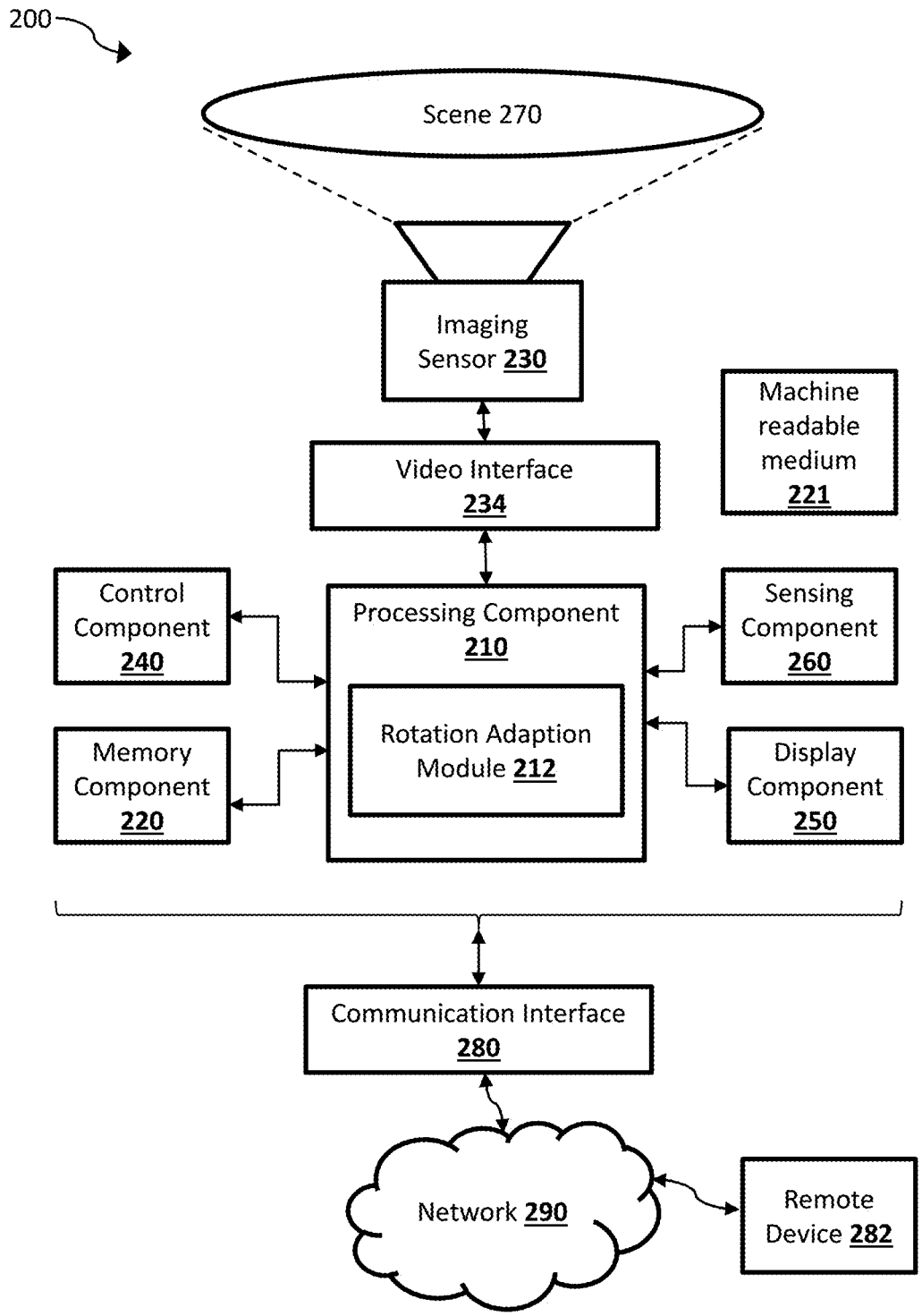
FIG. 2 illustrates a block diagram of a surveillance camera in accordance with an embodiment of the disclosure.

Turning now to FIG. 2, a block diagram is illustrated of a surveillance camera system 200 that is implemented within housing 101 of surveillance camera 102 for providing rotation-adaptive video analytics natively. System 200 comprises, according to one implementation, a processing component 210, a memory component 220, an imaging sensor 230, a video interface component 234, a control component 240, a display component 250, a sensing component 260, and a communication interface device 280.

Imaging sensor 230 of system 200 may be the same as sensor 120 of surveillance camera 102 as described above. Processing component 210 (logic device) may be implemented as any appropriate circuitry or device (e.g., a processor, microcontroller, application specific integrated circuit (ASIC), field-programmable gate array (FPGA), or other programmable or configurable logic devices) that is configured (e.g., by hardware configuration, software instructions, or a combination of both) to perform various operations to provide rotation-adaptive video analytics. For example, processing component 210 may be communicatively coupled to (e.g., configured to communicate with) imaging sensor 230 and memory component 220, and configured to determine a rotational orientation of surveillance camera 102 about optical axis 130, generate, based on image signals received from imaging sensor 102 and the determined rotational orientation, video image frames having a FOV with a vertical dimension that corresponds to the determined rotational orientation of surveillance camera 102, and perform video analytics on the generated video image frames.

It should be appreciated that rotation adaption module 212 may, in some embodiments, be integrated in software and/or hardware as part of processing component 210, with code (e.g., software instructions and/or configuration data) for rotation adaption 212 stored, for example, in memory component 220. In some embodiments, a separate machine-readable medium 221 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 221 may be portable and/or located separate from system 200, with the stored software instructions and/or data provided to system 200 by coupling the computer-readable medium to system 200 and/or by system 200 downloading (e.g., via a wired link and/or a wireless link) from computer-readable medium 221. For example, depending on specific embodiments, some or all of the operations to provide rotation-adaptive video analytics may be performed by processing component 210 and rotation adaption module 212. Thus, in some embodiments, processing component 210 may be communicatively coupled to (e.g., configured to communicate with) sensing component 260 and video interface 234, and configured to receive image signals from imaging sensor 230 via video interface 234, determine the rotational orientation of the surveillance camera, generate rotation-adaptive video image frames based on the image signals and the determined rotational orientation, and perform video analytics on the generated video image frames.

Memory component 220 comprises, in one embodiment, one or more memory devices configured to store data and information, including video image data and information. Memory component 220 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing component 210 may be configured to execute software instructions stored in memory component 220 so as to perform method and process steps and/or operations described herein. Processing component 210 and/or video interface 234 may be configured to store in memory component 220 video image frames or digital image data captured by the imaging sensor 230.

Video interface 234 may include, in some embodiments, appropriate input ports, connectors, switches, and/or circuitry configured to interface with imaging sensor 230 to receive image signals (e.g., digital image data). The received videos or image data may be provided to processing component 210. In this regard, the received videos or image data may be converted into signals or data suitable for processing by processing component 210. For example, in one embodiment, video interface 234 may be configured to receive analog video data and convert it into suitable digital data to be provided to processing component 210.

Control component 240 comprises, in one embodiment, a user input and/or interface device, such as a rotatable knob (e.g., potentiometer), push buttons, slide bar, keyboard, touch sensitive display devices, and/or other devices, that is adapted to generate a user input control signal. Processing component 210 may be configured to sense control input signals from a user via control component 240 and respond to any sensed control input signals received therefrom. Processing component 210 may be configured to interpret such a control input signal as a value, as generally understood by one skilled in the art. In one embodiment, control component 240 may comprise a control unit (e.g., a wired or wireless handheld control unit) having push buttons adapted to interface with a user and receive user input control values. In one implementation, the push buttons of the control unit may be used to control various functions of system 200, such as initiate a calibration, adjusting one or more parameters of video analytics, autofocus, menu enable and selection, field of view, brightness, contrast, noise filtering, image enhancement, and/or various other features of an imaging system or camera.

Display component 250 comprises, in one embodiment, an image display device (e.g., a liquid crystal display (LCD)) or various other types of generally known video displays or monitors. Processing component 210 may be configured to display image data and information (e.g., video analytics information) on display component 250. Processing component 210 may be configured to retrieve image data and information from memory component 220 and display any retrieved image data and information on display component 250. Display component 250 may comprise display circuitry, which may be utilized by the processing component 210 to display image data and information. Display component 250 may be adapted to receive image data and information directly from the imaging sensor 230, processing component 210, and/or video interface component 234, or the image data and information may be transferred from memory component 220 via processing component 210.

Sensing component 260 comprises, in one embodiment, one or more sensors of various types, including orientation sensor, implemented with a gyroscope, accelerometer, or other appropriate sensor that is disposed within or relative to housing 101 and configured to detect the rotational orientation of surveillance camera 100 about the optical axis direction. In such embodiments, processing component 210 may be configured to communicate with or otherwise utilize sensing component 260 to determine the rotational orientation.

In some embodiments, adjustable mount 106 may include a position sensor which may be implemented, for example, using a potentiometer, optical sensor, or other sensor configured to detect a position of moveable joint 118. Processing component 210 may be configured to communicate with or otherwise utilize sensing component 260 to determine the rotational orientation based on the position of moveable joint 118, for example.

Communication interface device 280 may include a network interface component (NIC) or a hardware module adapted for wired and/or wireless communication with a network and with other devices connected to the network. Through communication interface device 280, processing component 210 may transmit video image frames generated at surveillance camera 102 to external devices (e.g., remote device 282), for example for viewing at a remote monitoring or surveillance station, and may receive commands, configurations, or other user input from external devices at a remote station. In various embodiments, communication interface device 280 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components, such as wireless transceivers, adapted for communication with a wired and/or wireless network. As such, communication interface device 280 may include an antenna coupled thereto for wireless communication purposes. In other embodiments, communication interface device 280 may be adapted to interface with a wired network via a wired communication component, such as a DSL (e.g., Digital Subscriber Line) modem, a PSTN (Public Switched Telephone Network) modem, an Ethernet device, a cable modem, a power-line modem, etc. for interfacing with DSL, Ethernet, cable, optical-fiber, power-line and/or various other types wired networks and for communication with other devices on the wired network.

In various embodiments, various components of system 200 may be combined and/or implemented, as desired or depending on the application or requirements. In one example, processing component 210 may be combined with memory component 220, the imaging sensor 230, video interface component 234, display component 250, communication interface device 280, and/or sensing component 260 and implemented within the enclosure of surveillance camera 102. In another example, processing component 210 may be combined with the imaging sensor 230, such that certain functions of processing component 210 are performed by circuitry (e.g., a processor, a microprocessor, a logic device, a microcontroller, etc.) within the imaging sensor 230.

Furthermore, in some embodiments, various components of system 200 may be distributed and in communication with one another over a network 290. In this regard, system 200 may include communication interface device 280 configured to facilitate wired and/or wireless communication among various components of system 200 over network 290. For example, some of the component may be implemented in surveillance camera 102 while the other components may be implemented in remote device 282. In such embodiments, components may also be replicated if desired for particular applications of system 200. That is, components configured for same or similar operations may be distributed over a network. For example, at least some of the components in system 200 may be implemented in both surveillance camera 102 and remote device 282. Further, all or part of any one of the various components may be implemented using appropriate components of a remote device 282 in communication with various components of system 200 via communication interface device 280 over network 290, if desired. Thus, for example, all or part of processor 210, all or part of memory component 220, and/or all of part of display component 250 may be implemented or replicated at remote device 282, and configured to perform rotation-adaptive video analytics as further described herein. In other embodiments, all components in system 200 are implemented in surveillance camera 102, and remote device 282 is omitted from the surveillance camera system. It will be appreciated that many other combinations of distributed implementations of system 200 are possible, without departing from the scope and spirit of the disclosure.

Figure 3:
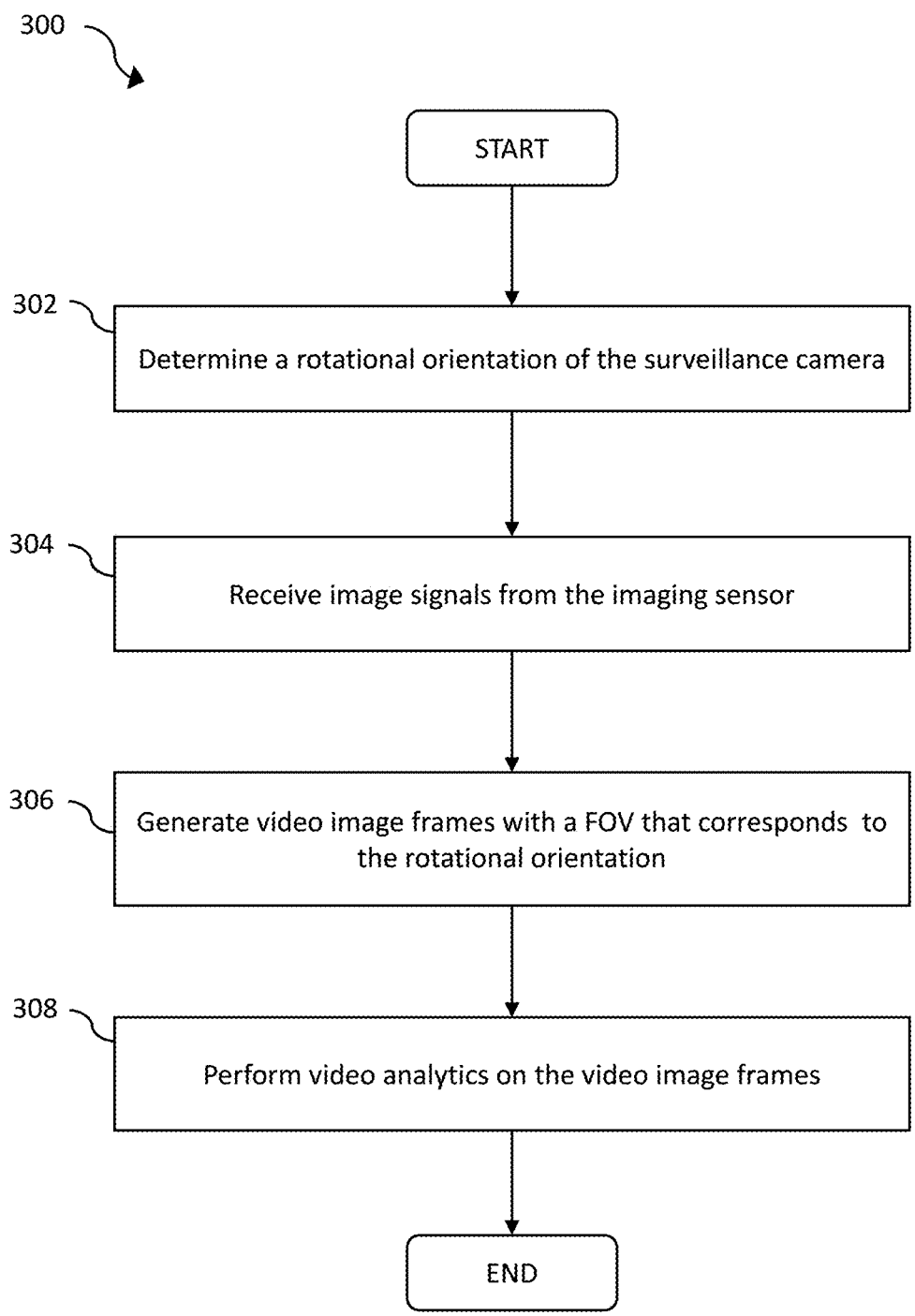
FIG. 3 illustrates a flowchart of a process 300 to provide rotation-adaptive video analytics in a surveillance camera in accordance with an embodiment of the disclosure

As discussed above, processing component 210 configured as such can provide rotation-adaptive video analytics. Details of such operations to provide rotation-adaptive video analytics are discussed in more details below. FIG. 3 illustrates a process 300 for providing rotation-adaptive video analytics. In some embodiments, process 300 is performed by surveillance camera 102, such as by processing component 210 utilizing various components of surveillance camera 102, when surveillance camera 102 is initially installed at a location or when surveillance camera 102 has been moved to a different location or orientation. It should, however, be appreciated that any other suitable cameras, devices, systems, and components may perform all or part of process 300.

Process 300 begins by determining (at step 302) a rotational orientation of the surveillance camera. The determination of a rotational orientation of surveillance camera 102 about optical axis 103 may be performed in various ways according to embodiments. For example, surveillance camera 102 according to some embodiments may include sensing component 260 that includes an orientation sensor. The orientation sensor may be implemented with a gyroscope, accelerometer, or other appropriate sensor that is disposed within or relative to housing 101 of surveillance camera 102. The sensing component 260 is configured to detect the rotational orientation of surveillance camera 102 about optical axis 130. In such embodiments, rotation adaption module 212 may be configured to communicate with or otherwise utilize sensing component 260 to determine the rotational orientation of surveillance camera 102.

In some embodiments, adjustable mount 106 may include a position sensor which may be implemented, for example, using a potentiometer, optical sensor, or other sensor configured to detect a position of moveable joint 118. Processing component 210 may be configured to be configured to communicate with or otherwise utilize sensing component 260 to determine the rotational orientation based on the position of moveable joint 118, for example.

In some embodiments, processing component 210 may be configured to determine the rotational orientation based on a user input received at control component 240 having one or more of a push button, slide bar, rotatable knob, touchpad, touchscreen, pointing device, keyboard, and/or other component that are actuatable by a user to provide an indication of whether surveillance camera 102 is to be installed in a normal (upright) orientation or rotated/pivoted to provide a FOV with a larger vertical dimension than a horizontal dimension.

In some embodiments, processing component 210 may be configured to determine the rotational orientation by processing the image signals received from imaging sensor 120. For example, processing component 210 may be configured to operate surveillance camera 100 in a training or calibration mode that tracks persons or vehicles and determine the rotational orientation as they move up and down along a corridor, road, or sidewalk to determine the perspective (e.g., based on the direction of movement and/or the change in sizes due to the perspective) capture by imaging sensor 120.

Process 300 then receives (at step 304) image signals from the imaging sensor. Based on the received image signals and the rotational orientation of surveillance camera 102 about optical axis 130 that is determined according to any of the embodiments discussed above, process 300 then generates (at step 306) video image frames with a FOV that corresponds to the determined rotational orientation. In some embodiments, rotation adaption module 212 is configured to generate video image frames having a FOV with a vertical dimension that corresponds to the determined rotational orientation of surveillance camera 102.

Figure 4B:
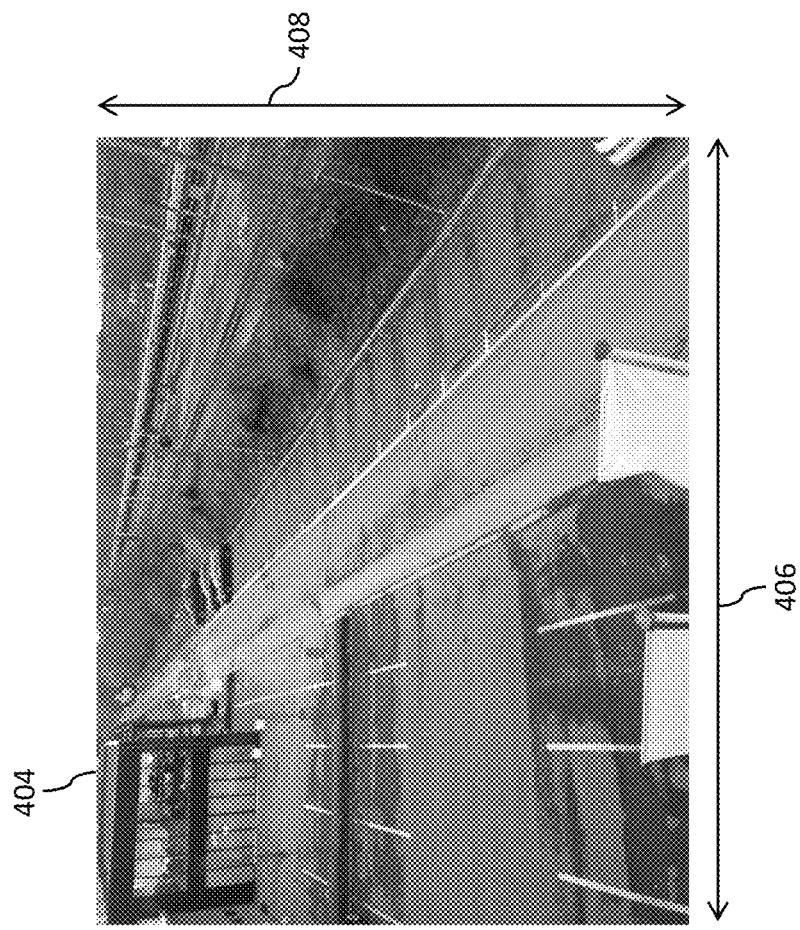
FIGS. 4A and 4B illustrate an a surveillance camera installed in its normal orientation and a corresponding example video image frame generated by the surveillance camera, in accordance with an embodiment of the disclosure.
Figure 4A:
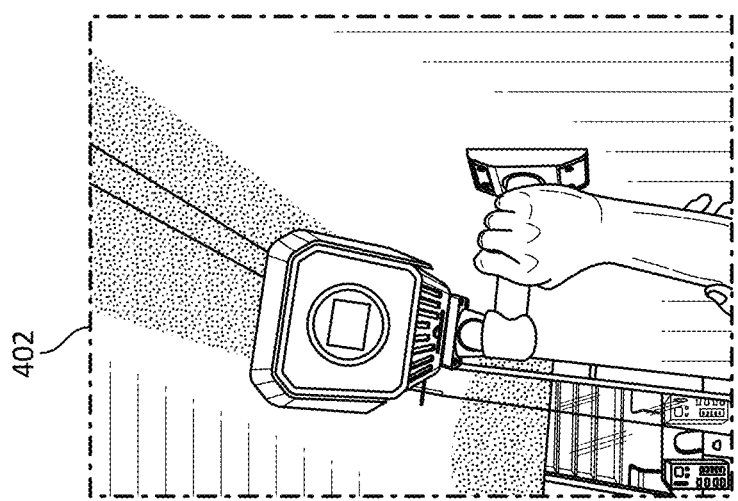

FIGS. 4A, 4B, 5A, 5B, and 6 illustrate the operations of generating video frames based on the determined rotational orientation of surveillance camera 102 in more detail. FIG. 4A is an image 402 of a surveillance camera (e.g., surveillance camera 102) being installed in its intended, normal orientation (in an upright position). FIG. 4B illustrates an example video image frame 404 of a scene that is captured and generated by processing component 210 of surveillance camera 102 that corresponds to the installation orientation as shown in FIG. 4A. As shown, since surveillance camera 102 was installed in its normal orientation, video image frame 404 has a FOV with a horizontal dimension 406 that is larger than its vertical dimension 408, which corresponds to the normal orientation of imaging sensor 120.

Figure 5B:
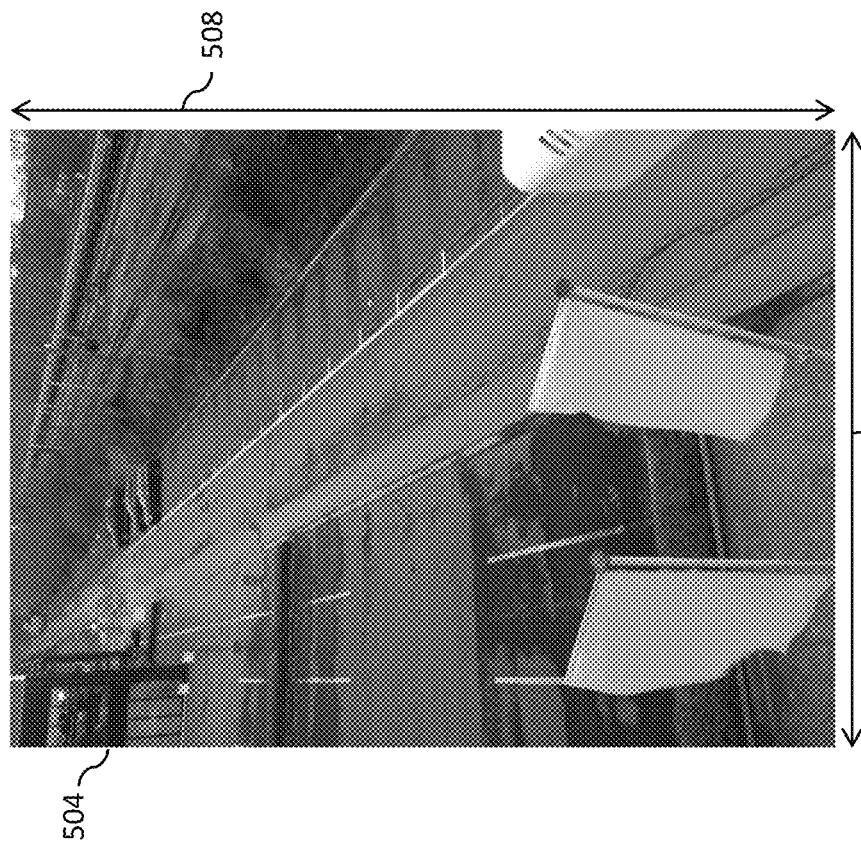
FIGS. 5A and 5B illustrate a surveillance camera installed at a 90-degree rotational orientation and a corresponding example video image frame generated by the surveillance camera to match a field-of-view corresponding to the rotational orientation, in accordance with an embodiment of the disclosure.
Figure 5A:
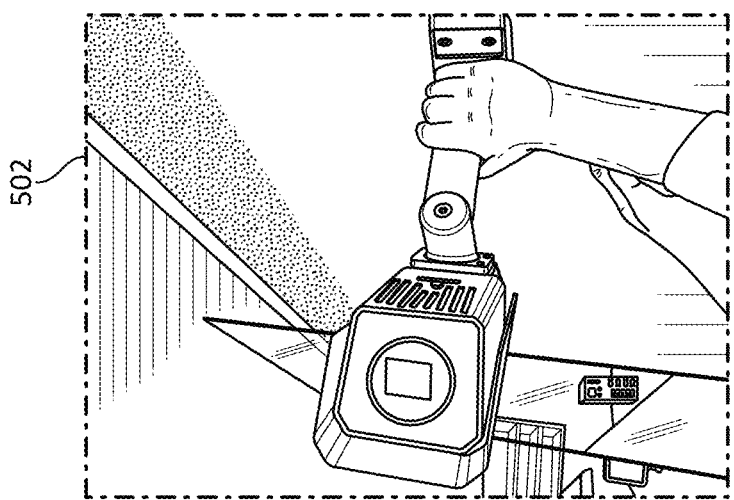

FIG. 5A is an image 502 of surveillance camera 102 being installed at a 90-degree rotational orientation (e.g., by pivoting surveillance camera 102 for 90 degrees about optical axis 130). FIG. 5B illustrates an example video image frame 504 of a scene that is captured and generated by processing component 210 of surveillance camera 102 that corresponds to the installation orientation as shown in FIG. 5A. As shown, in contrast with video image frame 404, image video frame 504 has a FOV with a vertical dimension 508 that is larger than its horizontal dimension 506. The adjusted native FOV as shown in image 504 allows surveillance camera 102 to properly perform calibration and other video analytics.

As can be seen from FIG. 5B, video image frame 504, generated by rotation adaption module 212 at surveillance camera 100, natively provides appropriate FOV and image orientation that corresponds to the installation orientation of surveillance camera 102. Without this rotation-adaptive generation of video image frames, interpretation of the video image frames would be difficult and performing video analytics on the video image frames would be difficult if not impossible, since the direction of movement, the orientations and positions of objects in the scene, and the FOV shown by the video image frames would not correspond to the actual scene captured by surveillance camera 102.

Figure 6:
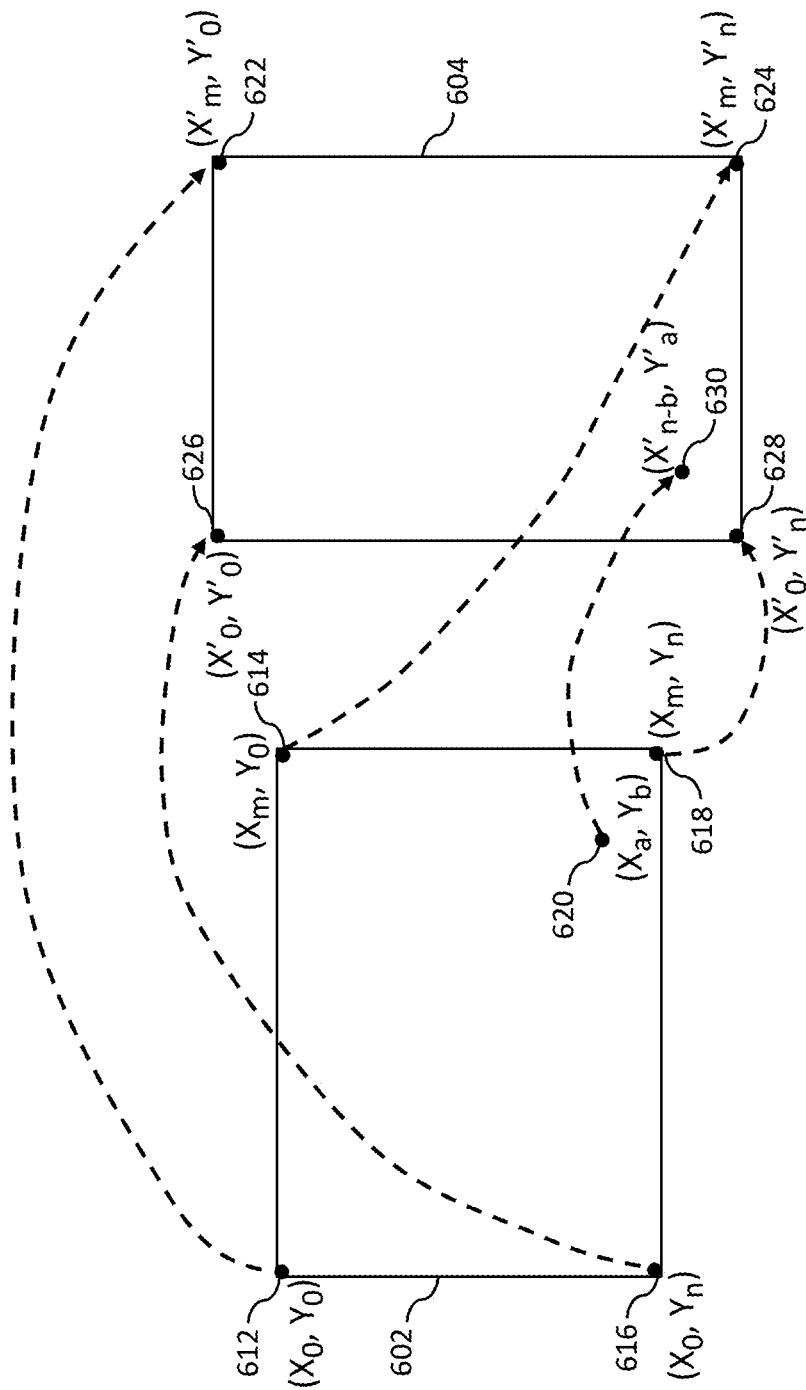
FIG. 6 illustrates an example of how video image frames having a FOV corresponding to the determined rotational orientation is generated in accordance with an embodiment of the disclosure.

FIG. 6 illustrates an example implementation of how processing component 210 can be configured to generate video image frames having a FOV with a vertical dimension that corresponds to the determined rotational orientation in accordance with an embodiment of the disclosure. In FIG. 6, video image frame 602 represents pixels as provided in the image signals from imaging sensor 120. In general, the image signals from imaging sensor 120 may be digital signals or data, or analog signals which are indicative of the sensed intensity for each sensor element locations in imaging sensor 120. Thus, video image frame 602 as provided in the image signals comprises pixels arranged in a horizontally wide rectangle corresponding to the array of sensor elements in imaging sensor 120. Each of these pixels (e.g., only pixels 612, 614, 616, 618, and 620 are shown in FIG. 6 to avoid clutter) corresponds to a pixel location within an output FOV represented by an output video image frame. When it is determined that the surveillance camera 102 is installed in the intended, normal orientation (e.g., an upright position), processing component 210 is configured to map or assign each pixel to its original position. In an (x,y) coordinates position scheme where the top left corner has the (0, 0) position in the output FOV, pixel 612 is assigned to position (0,0), pixel 614 is assigned to position (m, 0), pixel 616 is assigned to position (0, n), pixel 618 is assigned to position (m,n), and pixel 620 is assigned to position (a,b) in the output FOV.

However, if it is determined that the surveillance camera 102 is installed in an orientation other than the intended, normal orientation (e.g., installed on one side), processing component 210 is configured to remap or reassign the pixels to different positions in the output FOV. Video image frame 604 represents a video image frame after rotation adaption module 212 has remapped/reassigned the pixels to different positions in the output FOV when it is detected that surveillance camera 102 has been installed at a substantially 90-degree rotational orientation (e.g., by pivoting surveillance camera 102 for 90 degrees about optical axis 130, as shown in FIG. 5A). Based on the detected rotational orientation, processing component 210 is configured to generate a new FOV having a vertical dimension that corresponds to the detected rotational orientation (e.g., having a vertical dimension that is larger than the horizontal dimension). Rotation adaption module 212 is also configured to remap/reassign each pixel to a new position in the new FOV, for example, by applying a rotation transform that corresponds to the determined rotational orientation of surveillance camera 102 to natively generate video image frame in the new FOV. In this example, pixel 612 is remapped/reassigned from position (0,0) to position 622 (m,0), pixel 614 is remapped/reassigned from position (m,0) to position 624 (m,n), pixel 616 is remapped/reassigned from position (0,n) to position 626 (0,0), pixel 618 is remapped/reassigned from position (m,n) to position 628 (0,n), and pixel 620 is remapped/reassigned from position (a,b) to position 630 (n-b,a) in the new output FOV. After all of the pixels from the image signals are remapped/reassigned to their new positions in the new output FOV to natively generate video image frame 604, rotation adaption module 212 may output video image frame 604 to other components or external devices to perform operations on video image frame 604. In some embodiments, process 300 performs (at step 308) video analytics on the video image frames (e.g., video image frame 604).

It is noted that rotation adaption module 212 may be configured to change the orientation of the FOV upon detecting a rotational orientation change that exceeds a threshold. For example, rotation adaption module 212 of some embodiments may be configured to apply a 90-degree rotational transform to the pixels of image signals when the determined rotational orientation is more than 45 degrees off the normal orientation.

In some embodiments, the image signals from imaging sensor 120 may actually be converted and stored (e.g., buffered) as video image frame (e.g., video image frame 602) in an image buffer (e.g., implemented in memory component 220 as a software data structure or in hardware), and processing component 210 may access the image buffer to remap the pixels as discussed above and store the resulting video image frame 604 in the image buffer. In some embodiments, the image signals from imaging sensor 120 may be received by processing component 210, which may remap and store video image frame 604 in the image buffer without creating an intermediate video image frame 602. In either case, the resulting video image frame 604 with an appropriate image FOV or orientation that corresponds to the installation orientation of surveillance camera 102 is provided from the image buffer as a native output of surveillance camera 102.

As briefly discussed above, the rotation-adaptive video image frames (e.g., video image frames 504, 604) generated natively at surveillance camera 102 advantageously permit calibration and/or video analytics to be performed correctly. In this regard, calibration and/or video analytics operations performed by processing component 210 are adaptive to the FOV captured in the video image frames so as to access, analyze, and/or process the pixels of the video image frames according to the rotational orientation of surveillance camera 102 when the video image frames were captured. For example, the video analytics operations may be configured to detect and process video image frames natively output at an aspect ratio of 4:3, 3:4, 5:4, 4:5, 16:9, and 9:16 (e.g., an image dimensions of 640×480, 480×640, 640×512, 512× 640, 1280×720, and 720×1280).

Figure 7A:
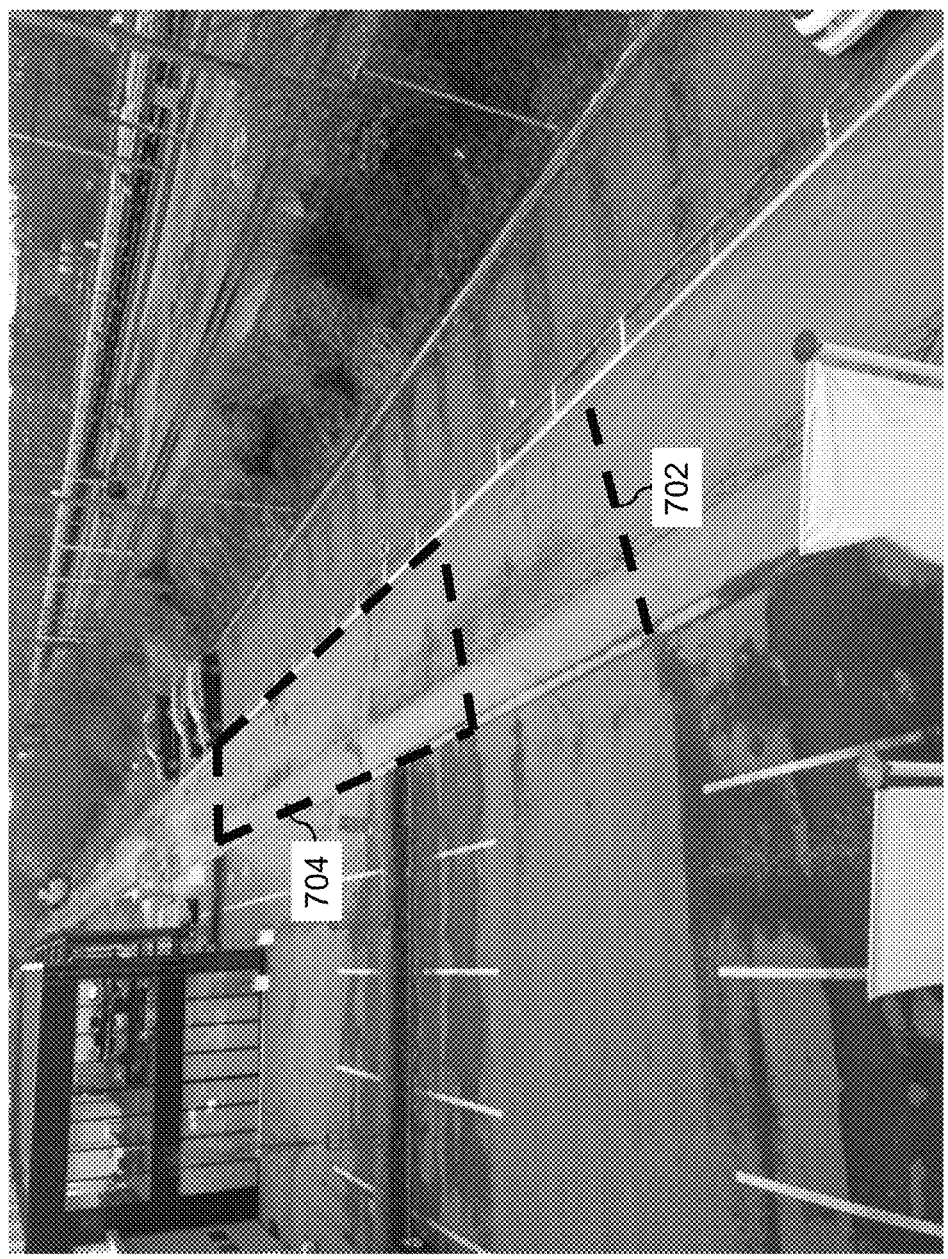
FIGS. 7A and 7B illustrate examples of how rotation-adaptive video analytics operations may be performed in accordance with an embodiment of the disclosure.
Figure 7B:
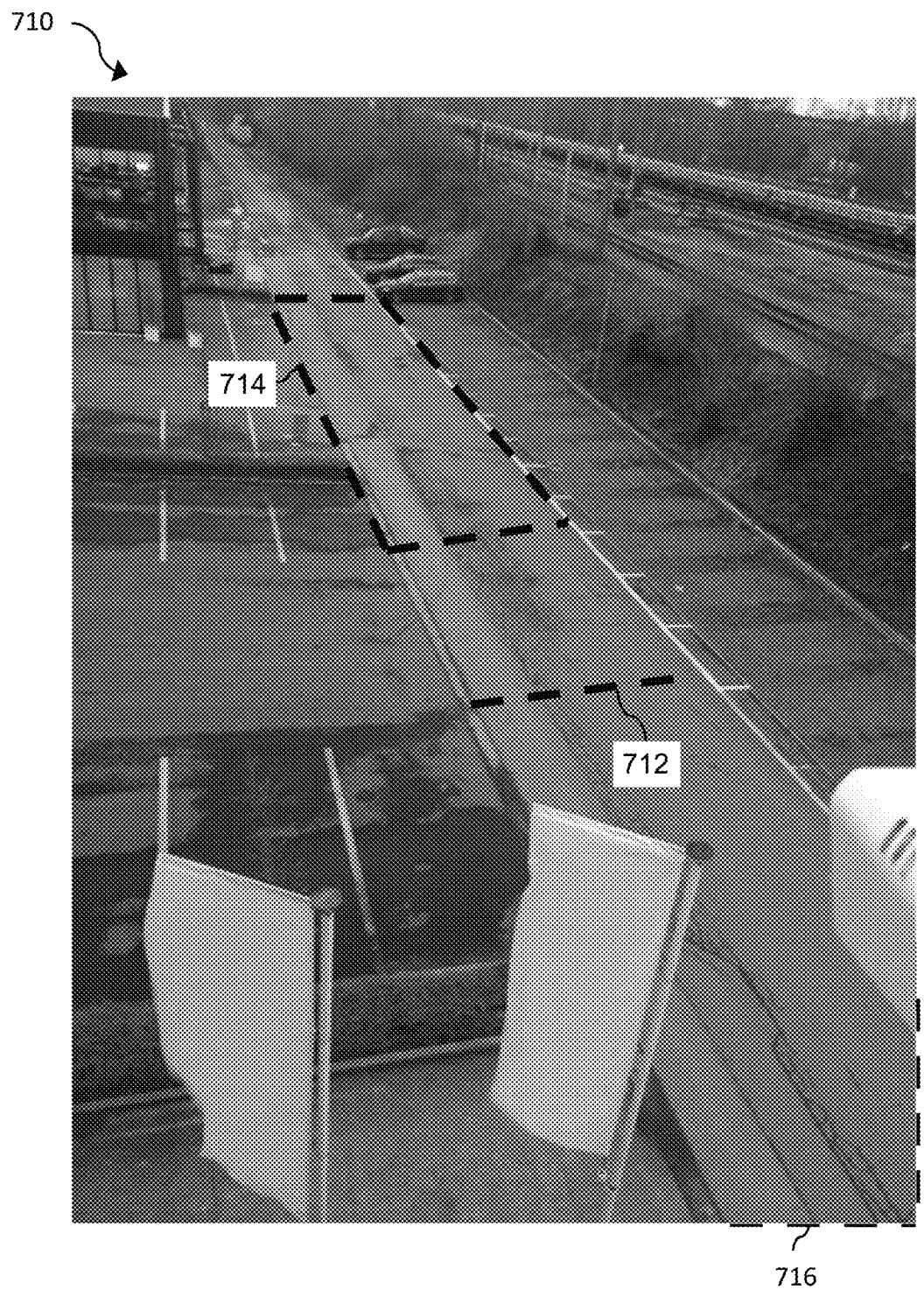

As mentioned above, one or more video analytics may be performed on the video image frames that are natively generated by surveillance camera 102. Different embodiments may perform different video analytics on the video image frames. For example, processing component 210 of some embodiments is configured to enable a user to provide video analytics marker to the scene captured by surveillance camera 102 and to perform one or more object detection, identification, or tracking based on the user provided video analytics marker. FIGS. 7A and 7B illustrate examples of how such rotation-adaptive video analytics operations, specifically video analytics markers, may be performed in accordance with an embodiment of the disclosure. FIG. 7A illustrates a video image frame 700 generated by processing component 210 when surveillance camera 102 is installed in an intended, normal orientation. As shown, video image frame 700 has a FOV with a shorter vertical dimension and a wider horizontal dimension corresponding to a normal (e.g., upright) installation orientation of surveillance camera 102. In comparison, FIG. 7B illustrates video image frame 710 generated by processing component 210 when surveillance camera 102 is installed/adjusted to a different rotational orientation such that the FOV has a larger vertical dimension than the horizontal dimension. As shown, video image frame 710 has a taller vertical dimension and a narrower horizontal dimension corresponding to a 90-degree installation orientation. Since the main surveillance interest in this example is to monitor objects and activities on the road, it can be appreciated that the FOV provided by image video frame 710 offers better coverage than image video frame 700 as video image frame 710 captures a portion 716 of the road not covered in video image frame 700. Thus, users can place video analytics markers for detection, for example, in that extra portion 716 with the FOV provided by the video image frame 710.

Since the video analytics operations according to embodiments of the disclosure are aware of the FOV captured in the video image frames and adapt accordingly to access, analyze, and/or process the pixels of the video image frames, the video analytics operations can place video analytics markers (e.g., based on user's input via control component 240) such as virtual tripwires 702 and 712 or detection zones 704 and 714 in correct corresponding locations in video image frames 700 and 710, respectively, to perform detection or other video analytics operations. In some embodiments, processing component 210 is configured to provide a user interface that enables a user to provide indication for the video analytics markers (e.g., received via control component 240 and/or from an external device at a remote monitoring station 282) regardless of the FOV captured in the video image frames. By contrast, in conventional surveillance cameras and systems, placing video analytics markers and performing video analytics operations may be difficult if not impossible when surveillance cameras are rotated because the direction of movement and the orientations and positions of objects do not correspond to the actual scene, even if the video image frames are rotated for display by an external device at a remote monitoring station. Once the video analytics markers are placed on the video image frame, processing component 210 may begin perform video analysis on subsequent video image frames, for example, detecting objects or movement or objects within the video image frames based on the video analytics markers (when certain objects appear or move into an area in the scene represented by detection zones 704 and 714, when certain objects crosses a line within the scene represented by virtual tripwires 702 and 712, etc.), identifying objects based on the video analytics markers, etc.

It has been contemplated that after the initial installation of surveillance camera 102 at the original rotational orientation, the user might decide that a different rotational orientation could provide a better FOV. The user might have already performed certain video analytics configurations (e.g., indicated the video analytics markers on the video image frame) when the surveillance camera 102 was in its original orientation. In some embodiments, processing component 210 is configured to retain the video analytics configurations after the user has changed the rotational orientation of surveillance camera 102. For example, by analyzing pixel values and performing object recognition algorithms, processing component 210 of some embodiments can be configured to identify the locations of the video analytics markers in the new FOV after the rotational orientation of surveillance camera 102 has been changed. In these embodiments, in response to detecting a change of rotational orientation of surveillance camera 102, processing component 210 is configured to not only perform rotational transform to image signals and generate video image frames in a new FOV that corresponds to the new rotational orientation, processing component 210 is also configured to automatically adjust the video analytics configuration parameters (e.g., video analytics markers) based on the new FOV. In one embodiment, processing component 210 is configured to adjust the video analytics markers by determining the pixel positions corresponding to the video analytics markers and apply a rotational transform (e.g., the same rotational transform being applied to the pixels) to the pixel positions of the markers. In another embodiment, processing component 210 is also configured to analyze pixel values from an image video frame captured before the change of rotational orientation and pixel values from an image video frame captured after the change of rotational orientation to determine a remapping/reassigning of pixel positions for the video analytics markers. This way, the user is not required to provide additional video analytics parameter input after adjusting the rotational orientation of surveillance camera 102.

For example, surveillance camera 102 determines video analytics markers (e.g., virtual tripwire 702 and detection zone 704 of FIG. 7), after receiving user input when surveillance camera 102 is mounted in its intended, normal orientation. As such, the user input was made with respect to the FOV provided in video image frame 700. In some embodiments, when the user changed the rotational orientation of camera 102 such that the FOV has changed to that provided in video image frame 710, processing component 210 is configured to automatically remap/reassign pixel positions for the video analytics markers to generate virtual tripwire 712 based on virtual tripwire 702, and detection zone 714 based on detection zone 704, so that the new video analytics markers correspond to the same area and location within the scene as the old video analytics markers.

It is noted that calibration may be required on surveillance camera 102 before any video analytics cam be performed. For example, when a surveillance camera for video analytics is installed at a certain location, the camera (e.g., the video analytics operations to be performed for the camera) typically requires calibration to correlate the real-world scene with the captured images, such as to determine the sizes and/or aspect ratios of objects of interest (e.g., persons, vehicles) as they appear in the captured images so that detection of those objects of interest can be performed accurately during video analytics operations. In some embodiments, processing component 210 is configured to perform calibration for camera 102. For example, processing component 210 of some embodiments is configured to perform the calibration operation for camera 102 by detecting/tracking an object moving around in a scene captured by imaging sensor 120, and determining correlations between different image location on the video image frame and corresponding image sizes of the tracked object.

Figure 8:
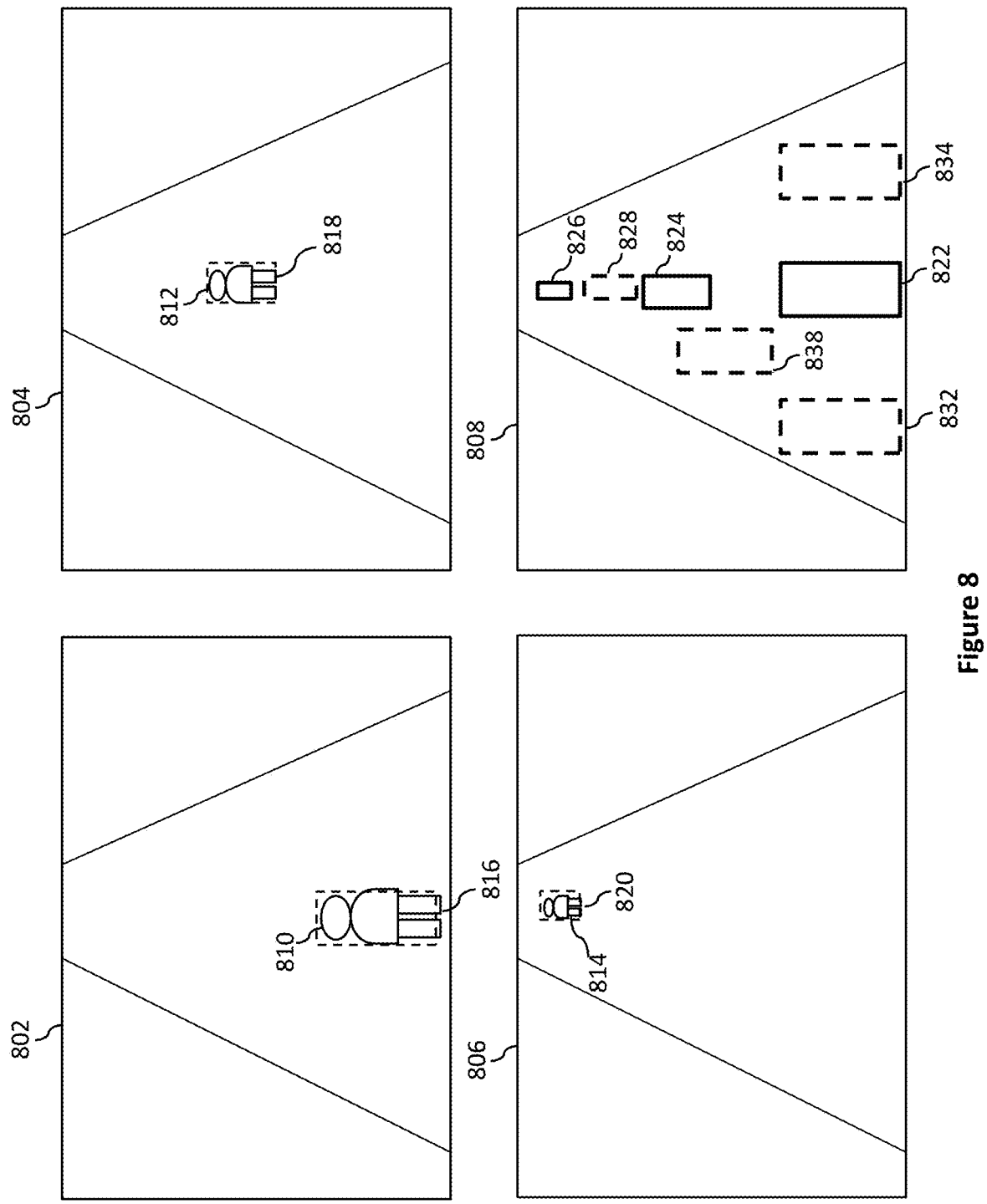
FIG. 8 illustrates an example calibration process performed by a surveillance camera in accordance with an embodiment of the disclosure.

FIG. 8 illustrates an example calibration process performed by processing component 210. Specifically, FIG. 8 illustrates video image frames 802, 804, and 806 that imaging sensor 120 captured of a scene a person is moving around within the scene. As shown, the movement of the person around the scene causes the image of the person to move from image location 816 in video image frame 802 to image location 818 in video image frame 804, and then to image location 820 in video image frame 806. In addition, due to the perspective of surveillance camera 102, the image size of the image of the person changes as the person moves in scene. As shown, image of the person 810 in video image frame 802 appears to be larger than image of the person 812 in video image frame 804, and image of the person 812 in video image frame 804 appears yet to be larger than image of the person 814 in video image frame 806. Due to the distance and perspective from surveillance camera 102 to the person, the size of the image of person in video image frames 802, 804, and 806 changes depending on the person's locations in the scene and corresponding image locations 816-820 in video image frames 802, 804, and 806. Thus, to perform video analytics more accurately, the varying image size of the person in video image frames 802, 804, and 806 should be known and accounted for.

In this regard, processing component 210 of surveillance camera 102 according to an embodiment is configured to detect and track the person moving about in the scene and determines a correlation between various image locations (e.g., including image locations 816-820) in video image frames 802, 804, and 806, and corresponding image sizes of the tracked object (e.g., the images 810-814). The determination of the correlation may in some embodiments include storing the association between the tracked image locations 816-820 and the corresponding imaged sizes of the object (e.g., image sizes of images 810, 812, and 814) as they appear in video image frames 802, 804, and 806. The determination of the correlation may in some embodiments include interpolating and/or extrapolating, for example using a regression algorithm, the stored association between the tracked image locations and the corresponding imaged sizes to obtain estimated imaged size for image locations that have not been tracked. In this way, the imaged size need not be recorded for every possible image location, but rather the imaged size can be estimated with sufficient accuracy from a predetermined number of tracked image locations.

FIG. 8 also shows an image frame 808 that displays various recorded and learned correlations between image sizes of the person and corresponding image locations. After analyzing video image frames 802, 804, and 806, processing component 210 may be configured to store the image sizes of the person and their corresponding image locations on image frame 808. As shown, the recorded image sizes and corresponding image locations are represented on image frame 808 as solid rectangular boxes, such as image size 822 that corresponds to image location 816, image size 824 that corresponds to image location 818, and image size 826 that corresponds to image location 820. In addition, using a regression algorithm, processing component 210 may be configured to extrapolate/interpolate additional image sizes at other image location on image frames 808. For example, processing component 210 may be configured to estimate image size of the person at image location 828 (displayed as broken rectangular box) based on the rate of change of image sizes 822, 824, and 826 (e.g., how fast the image sizes change/shrink) and the position of image location 828 relative to image locations 816, 818, and 820. Since image location 828 is between image locations 818 and 820, the estimated size at image location 828 by processing component 210 is larger than image size 826 but smaller than image size 824.

In some embodiments, estimated image sizes may be determined to be similar for image locations that differ in their horizontal locations of the scene (different locations across the image frame that is parallel to the horizon of the scene) but have same or adjacent vertical locations of the scene (different location in a direction that is perpendicular to the horizon of the scene). When surveillance camera 102 is installed in an upright orientation (the intended, normal orientation), such that the horizontal dimension of image sensor 120 is parallel to the horizon of the scene (as in the case in the example illustrated here), the horizontal dimension (e.g., x-axis or width) of the video image frames is parallel to the horizon of the scene, and the vertical dimension (e.g., y-axis or height) of the video image frames is perpendicular to the horizon of the scene.

In the example illustrated here, since surveillance camera 102 was installed in an upright position (as detected by processing component 210), processing component 210 is configured to determine that the horizon of the scene is parallel to the width of the image frame. As such, processing component 210 is configured to estimate that image sizes of the person at various horizontal image locations should be the same. For example, calibration and analytics module 212 may be configured to estimate that image sizes at image locations 832 and 834 to be the same as image size 822 (indicated as dotted rectangular boxes). Furthermore, calibration and analytics module 212 may be configured to estimate image sizes at other locations (e.g., image location 838) using the techniques described above. In addition to determining correlation between image sizes and image locations, processing component 210 of some embodiments is also configured to determine a correlation between the actual size of an object (e.g., the person) and the image sizes of the object at various image locations. The correlations determined may be used by processing component 210 to perform various video analytics (e.g., detecting/identifying objects based on video analytics markers, etc.).

As shown, the calibration operation was performed while the surveillance was mounted in its intended, normal (upright) orientation in this example. It can be appreciated that the same calibration operation may be performed on video image frames when surveillance camera 102 is installed at a substantially 90-degree rotational orientation such that the FOV provided has a larger vertical dimension than its horizontal dimension. Since rotation adaption module 212 is configured to produce video image frames having a FOV that is adaptive to the rotational orientation in which surveillance camera 102 is installed, processing component 210 may properly perform the calibration process using the natively generated video image frames, as the height, width, and/or direction of the object's movement can all be properly determined based on the natively generated video image frames.

Figure 9:
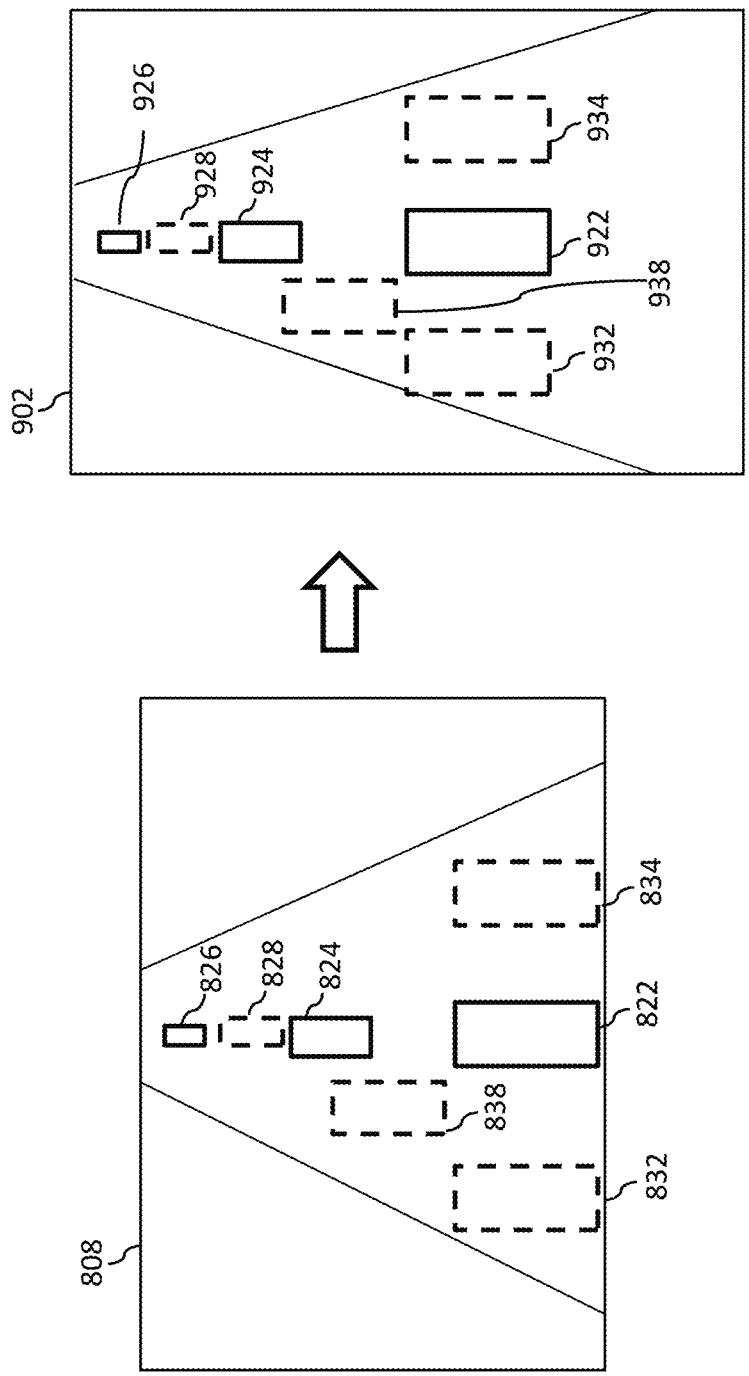
FIG. 9 illustrates an example of adjusting the calibration configuration in response to a change of rotational orientation of the surveillance camera in accordance with an embodiment of the disclosure.

It is also noted that the user might desire to change the rotational orientation of surveillance camera 102 to obtain a new FOV (e.g., from a FOV having a larger horizontal dimension to a FOV having a larger vertical dimension such that more of the alley can be shown in the new FOV). FIG. 9 illustrates a video image frame 902 captured by imaging sensor 120 after the user has pivoted surveillance camera 102 for 90 degrees about optical axis 130. In some embodiments, processing component 210 is configured to adaptively adjust the correlations determined during the calibration process to correspond to the new FOV such that it is not necessary to perform another calibration process after the rotational orientation of surveillance camera 102 is changed.

For example, by analyzing pixel values and performing object recognition algorithms, processing component 210 of some embodiments can be configured to identify the image locations in the new FOV after the rotational orientation of surveillance camera 102 has been changed that corresponds to image locations in the old FOV before the rotational orientation of surveillance camera 102 is changed. In these embodiments, in response to detecting a change of rotational orientation of surveillance camera 102, processing component 210 is configured to automatically adjust the correlations of image sizes and image locations based on the new FOV. In one embodiment, processing component 210 is configured to analyze pixel values from an image video frame captured before the change of rotational orientation and pixel values from an image video frame captured after the change of rotational orientation to determine a remapping/reassigning of pixel positions for the video analytics markers. For example, processing component 210 may determine that image location 922 in video image frame 902 corresponds to image location 822 in video image frame 808 by determining that they represent the same area in the scene based on an analysis of the pixel values. Similarly, processing component 210 may determine that image location 924 in video image frame 902 corresponds to image location 824 in video image frame 808, image location 926 in video image frame 902 corresponds to image location 826 in video image frame 808, image location 928 in video image frame 902 corresponds to image location 828 in video image frame 808, image location 932 in video image frame 902 corresponds to image location 832 in video image frame 808, image location 934 in video image frame 902 corresponds to image location 834 in video image frame 808, image location 938 in video image frame 902 corresponds to image location 838 in video image frame 808. Based on the mapping of image locations between the old FOV and new FOV, processing component 210 is configured to adjust the correlations between image sizes and image locations, and correlations between actual physical size of objects with image sizes at different image locations for the new FOV automatically, without any user input, and without requiring performing another calibration operation. As such, surveillance camera 102 may perform various video analytics (e.g., detection of objects within the scene, identification of objects within the scene, etc.) seamlessly even if the user decides to adjust the rotational orientation of the camera.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A surveillance camera, comprising:
    an imaging sensor configured to generate image signals representing a scene within a sensor field of view (FOV) of the imaging sensor, the sensor FOV having a vertical dimension and a horizontal dimension that is wider than the vertical dimension;
    an adjustable mount configured to securely attach the surveillance camera to a structure and adjustable to rotate or pivot the surveillance camera about an optical axis direction; and
    a logic device communicatively coupled to the imaging sensor and configured to:
        determine a rotational orientation of the surveillance camera about the optical axis direction;
        generate, based on the image signals and the determined rotational orientation, video image frames by remapping coordinates of pixels represented in the image signals using rotation transform in a direction based on the determined rotational orientation of the surveillance camera, the video image frames having an output FOV with a vertical dimension that corresponds to the determined rotational orientation; and
        perform video analytics on the generated video image frames.

2. The surveillance camera of claim 1, further comprising a communication interface device communicatively coupled to the logic device and configured to provide a wired and/or wireless connection to an external device, wherein the logic device is configured to transmit the generated video image frames to the external device for display via the communication interface device.

3. The surveillance camera of claim 2, wtherein the logic device is configured to receive, via the communication interface device, a user indication of a video analytics marker that defines an area within the scene based on the output FOV.

4. The surveillance camera of claim 3, wherein the video analytics comprise detecting presence or activities of objects within the area of the scene represented by the video analytics marker.

5. The surveillance camera of claim 3, wherein the logic device is further configured to:
    detect a change of the rotational orientation of the surveillance camera about the optical axis direction;
    generate, based on image signals subsequently received from the imaging sensor and the detected change of the rotational orientation, video image frames having a new output FOV with a vertical dimension that corresponds to the changed rotational orientation; and
    modify the video analytics marker to correspond with the new output FOV.

6. The surveillance camera of claim 1, wherein the logic device is further configured to perform an automatic calibration by analyzing the generated video image frames according to the output FOV.

7. The surveillance camera of claim 1, further comprising an orientation sensor configured to detect a rotational orientation of the surveillance camera about the optical axis.

8. The surveillance camera of claim 7, wherein the orientation sensor comprises a potentiometer configured to detect a position of a movable joint of the surveillance camera.

9. The, surveillance camera of claim 1, wherein determining the rotational orientation comprises analyzing image signals received from the imaging sensor to detect the rotational orientation.

10. A method, comprising:
    generating, by an imaging sensor of a surveillance camera, image signals representing a scene within a sensor field of view (FOV) of the imaging sensor, the sensor FOV having a vertical dimension and a horizontal dimension that is wider than the vertical dimension;
    determining, by a logic device of the surveillance camera, a rotational orientation of the surveillance camera about an optical axis direction of the surveillance camera;
    generating, by the logic device based on the image signals and the determined rotational orientation, video image frames comprises remapping coordinates of pixels represented in the image si mals using a rotation transform in a direction based on the determined rotational orientation of the surveillance camera, the video image frames having an output FOV with a vertical dimension that corresponds to the determined rotational orientation; and
    performing video analytics on the generated video image frames.

11. The method of claim 10, further comprising transmitting, by the logic device, the generated video image frames over a wired and/or wireless connection to an external device for display.

12. The method of claim 11, further comprising receiving, by the logic device, a user indication of a video analytics marker that defines an area within the scene based on the output FOV.

13. The method of claim 12, wherein the performing of the video analytics comprises detecting presence or activities of objects within the area of the scene represented by the video analytics marker.

14. The method of claim 12. further comprising:
    detecting, by the logic device, a change of the rotational orientation of the surveillance camera about the optical axis direction;
    generating, by the logic device, based on image signals subsequently received from the imaging sensor and the detected change of the rotational orientation, video image frames having a new output FOV with a vertical dimension that corresponds to the changed rotational orientation; and modifying, by the logic device, the video analytics marker to correspond with the new output FOV.

15. The method of claim 10, further comprising performing, by the logic device, an automatic calibration by analyzing the generated video image frames according to the output FOV.

16. The method of claim 10, wherein the determining of the rotational orientation of the surveillance camera comprises receiving orientation sensor data from an orientation sensor of the surveillance camera.

17. The method of claim 16, wherein the orientation sensor data comprises sensor data received from a potentiometer configured to detect a position of a movable joint of the surveillance camera.

18. The method of claim 10, wherein determining the rotational orientation comprises analyzing image signals received from the imaging sensor to detect the rotational orientation.

19. A surveillance camera, comprising:
- an, imaging sensor configured to generate image signals representing a scene within a sensor field of view (FOV) of the imaging sensor, the sensor FOV having a vertical dimension and a horizontal dimension that is wider than the vertical dimension;
- an adjustable mount configured to securely attach the surveillance camera to a structure and adjustable to rotate or pivot the surveillance camera about an optical axis direction;
- a communication interface device configured to provide a wired and/or wireless connection to an external device; and
- a logic device communicatively coupled to the imaging sensor and the communication interface device, wherein the logic device is configured to:
  - determine a rotational orientation of the surveillance camera about the optical axis direction;
  - generate, based on the image signals and the determined rotational orientation, video image frames having an output FOV with a vertical dimension that corresponds to the determined rotational orientation;
  - receive, via the communication interface device, a user indication of a video analytics marker that defines an area within the scene based on the output FOV;
  - transmit the generated video image frames to the external device for display via the communication interface device; and
  - perform video analytics on the generated video image frames.

20. The surveillance camera of claim 19, wherein the logic device is further configured to;
- detect a change of the rotational orientation of the surveillance camera about the optical axis direction; and
- adjust video analytics configuration parameters based on the change.

* * * * *

UNITED STATES PATENT AND TRADEMARK OFFICE
CERTIFICATE OF CORRECTION

PATENT NO. : 10,735,659 B2
APPLICATION NO. : 16/115455
DATED : August 4, 2020
INVENTOR(S) : Messely et al.

It is certified that error appears in the above-identified patent and that said Letters Patent is hereby corrected as shown below:

In the Specification

In the Cross-Reference to Related Applications:
In Column 1, Line 27, remove "Ser."

In the Claims

In Column 17, Line 59, change "wtherein" to --wherein--

In Column 18, Line 40, change "si mals" to --signals--

Signed and Sealed this
Twenty-fourth Day of November, 2020

Andrei Iancu
*Director of the United States Patent and Trademark Office*